United States Patent [19]

Tsunekawa et al.

[11] 4,335,942

[45] Jun. 22, 1982

[54] CAMERA PROVIDED WITH AUTOMATIC FOCUS DETECTOR

[75] Inventors: Tokuichi Tsunekawa, Yokohama; Takashi Amikura, Kawasaki, both of Japan

[73] Assignee: Canon Kabushiki Kaisha, Tokyo, Japan

[21] Appl. No.: 199,262

[22] Filed: Oct. 21, 1980

[30] Foreign Application Priority Data

Oct. 26, 1979 [JP] Japan .............................. 54-139549
Oct. 29, 1979 [JP] Japan .............................. 54-140045

[51] Int. Cl.³ .............................................. G03B 7/08
[52] U.S. Cl. ............................... 354/25; 354/44; 354/195; 354/198; 250/201
[58] Field of Search .............. 354/25, 25 A, 44, 195, 354/198; 250/201

[56] References Cited

U.S. PATENT DOCUMENTS 3,611,894 10/1971 Minneste .......................... 354/44
3,906,389 9/1975 Matsomoto et al. ............ 354/25 A
3,972,607 8/1976 Reider .............................. 354/44
4,240,726 12/1980 Wick ................................. 354/25

*Primary Examiner*—Russell E. Adams
*Attorney, Agent, or Firm*—Fitzpatrick, Cella, Harper & Scinto

[57] ABSTRACT

A camera provided with automatic focus detector is disclosed. The automatic focus detector drives a photographing lens toward the in-focus position by lens driving means in accordance with focus detection signal repeatedly put out from focus detecting means. The present invention is directed to improvement in focusing operation of such camera. Said lens driving means is allowed to drive the photographing lens toward the in-focus position only when the focus detection information signal continues to be constant longer than a predetermined time length. At the same time, the driving state of the photographing lens by said lens driving means is detected and display means is controlled by the detection signal to display the state of focusing now present.

11 Claims, 5 Drawing Figures

| STATES<br>TERMI-<br>NALS | FORWARD FOCUS | IN FORCUS | BACKWARD FOCUS |
|---|---|---|---|
| MU1 | L | L | H |
| MU2 | H | L | L |
| ML1 | L | H | H |
| ML2 | H | H | L |

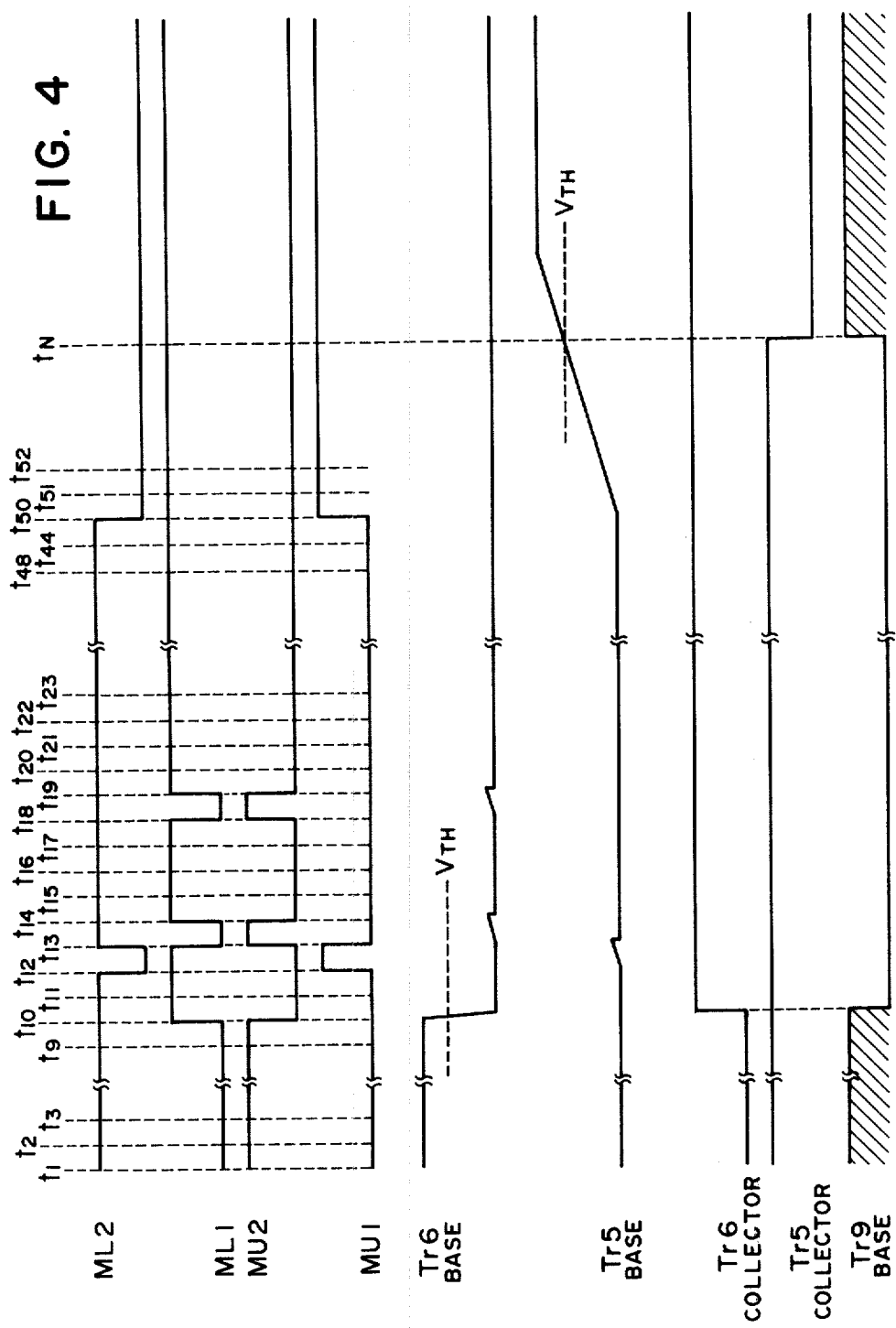

CAMERA PROVIDED WITH AUTOMATIC FOCUS DETECTOR

BACKGROUND OF THE INVENTION

1. Field of the Invention

The present invention relates to a camera provided with an automatic focus detector which assures a stable focusing operation and which enables the display of the states of focusing.

2. Description of the Prior Art

Automatic focus detector is often applied to 8 mm-cinecamera or other cameras. In this case, according to the prior art the focus detecting circuit repeatedly detects the focus position and the photographing lens is driven toward the in-focus position instantly in accordance with the information of focusing obtained by the repeating detections. By this quick response to the focus detection information, the picture image taken at that time is made unstable and the magnifying power for taking pictures is varied abruptly. As a result, there are sometimes produced degraded picture images. Therefore, for such cinecamera provided with an automatic focus detector it is desirable to eliminate such excessive responsiveness to focus detection information as given for a moment. It is also desirable to display the states of operation of the automatic focus detector within the viewfinder of the camera or the like so as to enable the operator to know the state of focusing operation at that time.

SUMMARY OF THE INVENTION

Accordingly, it is an object of the invention to provide a camera which is improved in stability of focusing operation by improving the responsiveness of the automatic focus detector mounted in the camera.

It is another object of the invention to provide a camera which is provided with a display device by which the operator can discriminate the in-focus position from other positions by his perception very easily in view of human technology.

According to one aspect of the invention to attain the above objects there is provided a camera with automatic focus detector in which the photographing lens is driven toward the in-focus position only when a predetermined focus detection signal is put out continuously for a certain predetermined time length during a focus detecting operation. If the focus detection output signal varies within a time period shorter than said determined time length, the driving of the photographing lens in accordance with the detection signal is made inactive so that instability of the focusing operation resulting from the excessive responsiveness of the automatic focus detector can be eliminated.

According to another aspect of the invention there is provided a camera with display means in which the state of focusing is displayed on the display unit only when a predetermined focus detection signal is put out continuously for a certain predetermined time length. Since a stable display can be made with this arrangement, there occurs no trouble of flicker of display, for example, in the case of visual display. Furthermore, variation of display caused by noise or other matters in the focus detecting circuit can be eliminated completely.

Other and further objects, features and advantages of the invention will appear more fully from the following description taken in connection with the accompanying drawings.

BRIEF DESCRIPTION OF THE DRAWINGS

FIG. 4 is a timing chart of the circuit shown in FIG. 3; and

DESCRIPTION OF PREFERRED EMBODIMENTS

Figure 1:
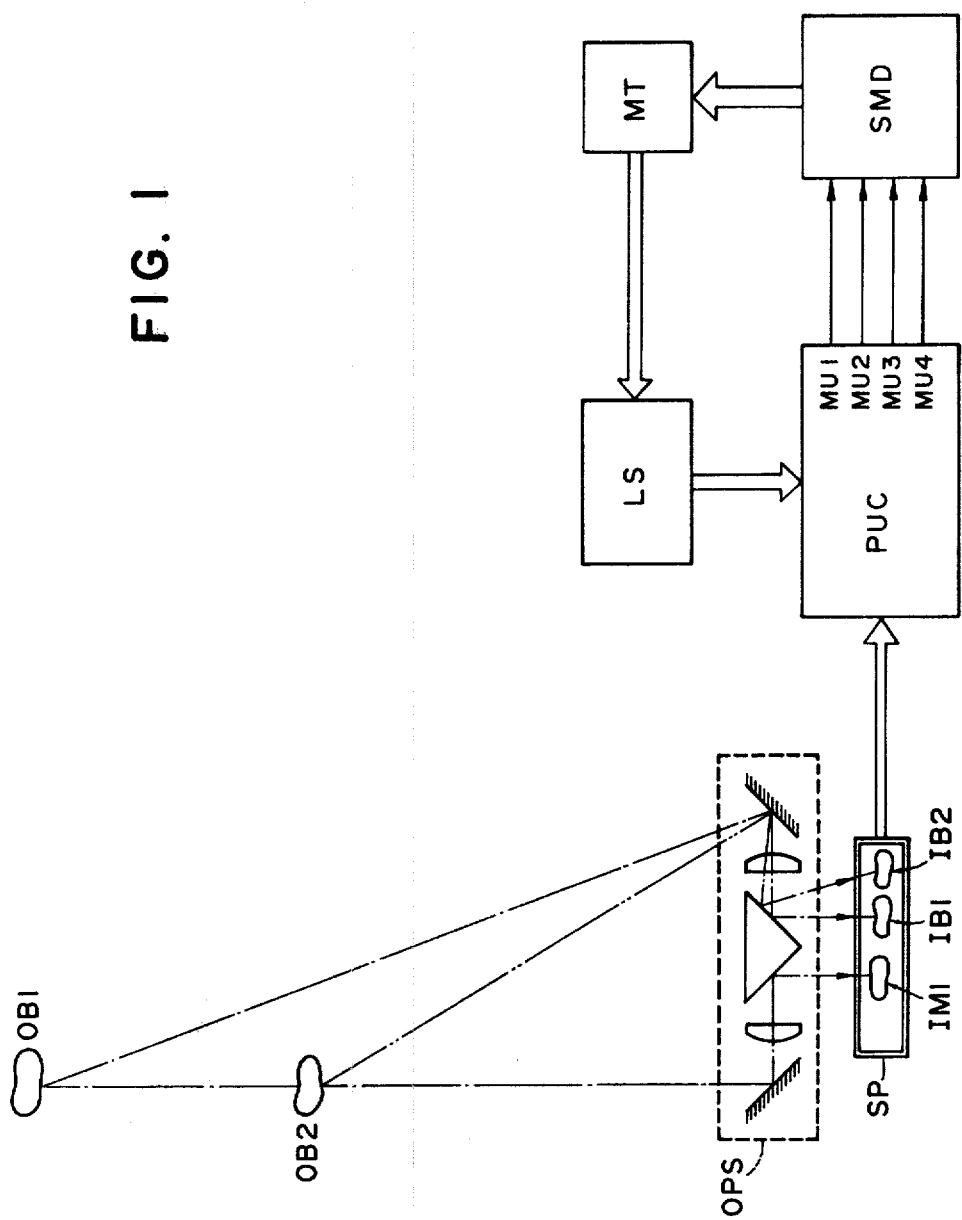
FIG. 1 is a block diagram showing a form of the automatic focus detector used in the invention.

In FIG. 1 showing an example of an arrangement of the focus detecting apparatus, reference character OPS designates a focus detecting optical block composed of mirrors, lenses, prism etc. SP is a solid image pick-up element such as CCD on which images of objects OB1 and OB2 are formed through the optical block OPS. Image IM1 on SP is a fundamental image and images IB1 and IB2 are reference images. The relative position between the fundamental image and reference images is detected through a later mentioned focusing operation control circuit PUC to measure the distance to the object.

From PUC the focus detection information is applied to a photographing lens driving control circuit SMD and a motor MT through control terminals MU1-MU4. Thereby, SMD and MT are driven to move a photographing lens LS toward the in-focus position.

Figures 2, 5:
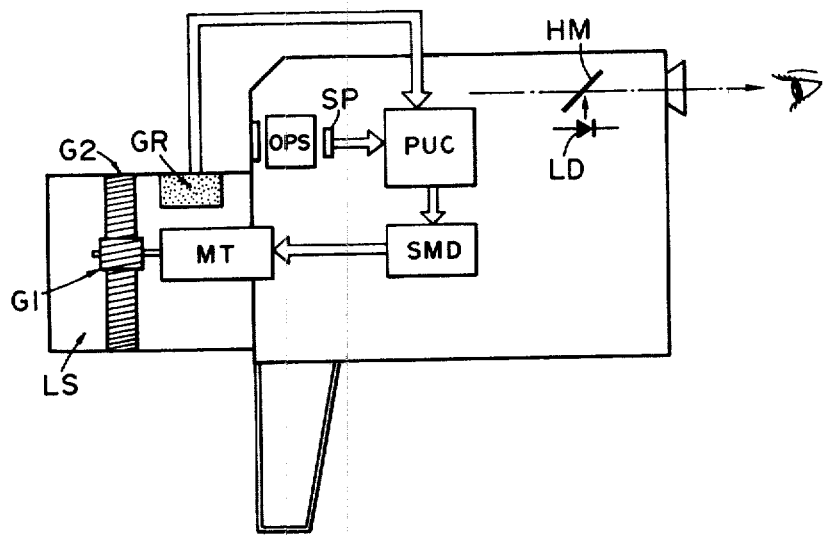
FIG. 2 is a block diagram of a cinecamera or video camera in which the automatic focus detector shown in FIG. 1 is incorporated.
FIG. 5 illustrates the outputs from the focusing state detecting circuit PUC.

FIG. 2 is a block diagram of an embodiment of the above automatic focus detector mounted in an 8 mm cinecamera or video camera.

G1 is a pinion gear mounted on the rotation axis of the motor MT, G2 is a focus ring driving gear mounted on a focus ring for photographing lens LS and GR is an information input grey code plate or resistor for transmitting the focusing state of the photographing lens LS to the focusing operation control circuit PUC. Focus information from GR and focus detecting image information from SP are compared with each other in PUC. When a coincidence of the former information and the latter information is detected, the photographing lens LS is stopped through control terminals MU1-MU4 and fixed at the position.

HM is a half-mirror and LD is a display element to indicate whether the photographing lens LS is in focus or not. The display element may be of visual type or of acoustic type. In the former case, the state of focusing is visually displayed in the finder of the camera. In the latter case, a predetermined acoustic signal pattern is uttered.

As the focusing operation control circuit PUC in FIGS. 1 and 2 there may be used, for example, that as disclosed in our prior application U.S. Ser. No. 121,690. Namely, DCS in FIG. 30 of the prior application may be used for PUC shown in the present application. As shown in FIG. 36 of the prior application and also FIG. 5 of the present application, at least three electric output signals can be obtained from terminals MU1, MU2, ML1 and ML2. These three different signals are indicative of three different focus states, that is, forward-focus, in-focus and rearward-focus respectively. While in the shown embodiment these three electric output signals are formed by four signal out terminals (MU1, MU2, ML1, ML2), this should not be considered to be limiting. For example, if binary code is used, then two bits are sufficient to display three different outputs. Also, these output signals may be analog outputs of three different levels. It is not essential for the present invention how such three different signals are produced.

The thing essential for the present invention is that at least three different kinds of discriminating signals indicative of forward-focus, in-focus and rearward-focus should be put out from the focus detecting circuit. In accordance with these three different signals the photographing lens is controlled for focusing. Also, in accordance with the different states of focusing there are displayed at least three different indications by a display means. When the apparatus is formed in this manner, the present invention brings forth remarkable effects.

Figure 3:
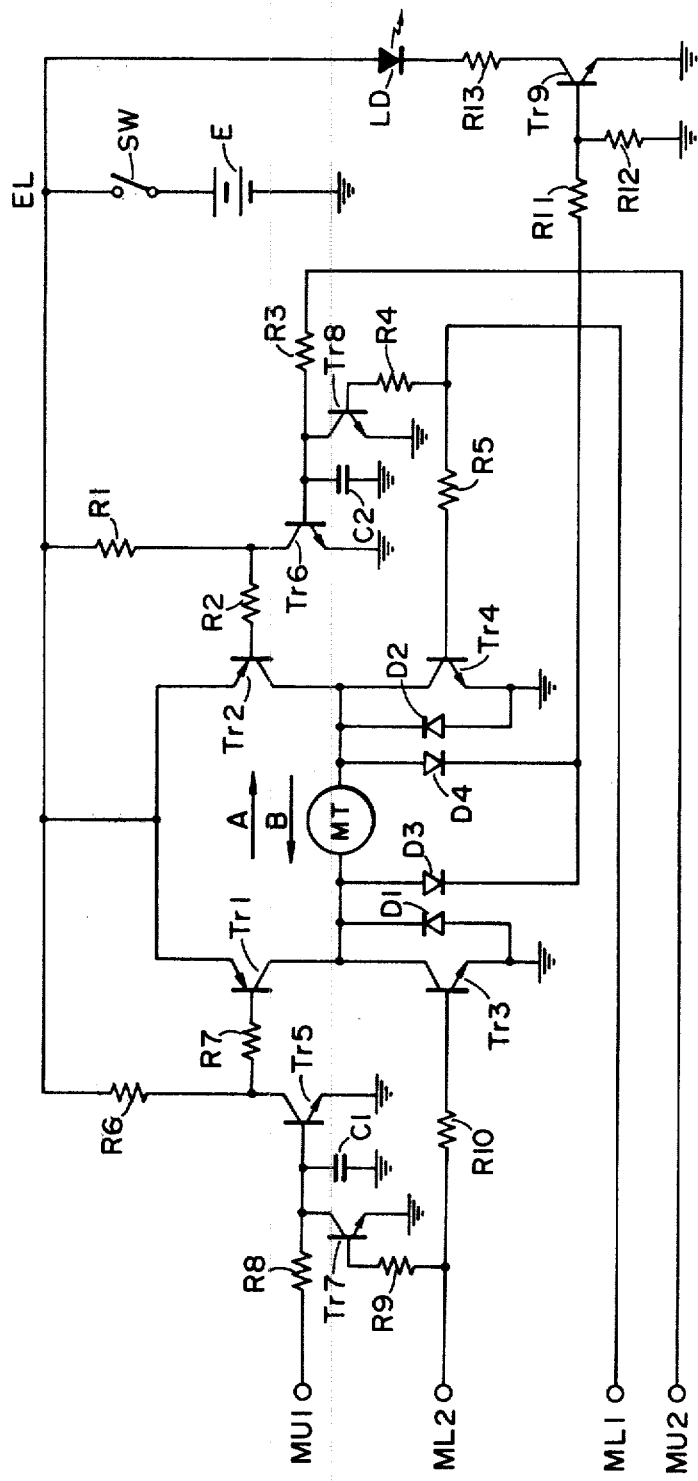
FIG. 3 is a circuit diagram showing an embodiment of a photographing lens driving circuit having a focusing state display circuit of the automatic focus detector according to the invention.

FIG. 3 shows an embodiment of the photographing lens driving circuit SMD of the automatic focus detector according to the invention. The circuit SMD includes an in-focus state display circuit.

In FIG. 3, $R_1$-$R_{13}$ are resistances, Tr1 and Tr2 are PNP transistors and Tr3 and Tr4 are NPN transistors. Tr1 through Tr4 constitutes a bridge to control the forward and reverse rotations of motor MT for driving the photographing lens LS. $D_1$-$D_4$ are diodes, Tr5 and Tr6 are NPN transistors for controlling Tr1 and Tr2 and Tr9 is a transistor for driving the in-focus state display element LD.

As seen from FIG. 3, the base of transistor Tr5 is connected to terminal MU1 through resistance $R_8$ and the base of Tr6 is connected to MU2 through $R_3$. Collectors of transistors Tr5 and Tr6 are connected to an electric power source line EL through resistors $R_6$ and $R_1$ respectively. Collectors of Tr5 and Tr6 are connected to bases of Tr1 and Tr2 through $R_7$ and $R_2$ respectively. Emitters of transistors Tr1 and Tr2 are connected to the power source line EL. Collectors of Tr1 and Tr2 are connected to the both terminals of motor MT and also to collectors of Tr3 and Tr4. Bases of Tr3 and Tr4 are connected to terminals ML2 and ML1 through $R_{10}$ and $R_5$ respectively. Connected to the both ends of motor MT and anodes of diodes $D_3$ and $D_4$ the cathodes of which are together connected to the base of Tr9 through $R_{11}$. The base of Tr9 is grounded through $R_{12}$. Emitter of Tr9 is also grounded and its collector is connected to the power source line EL through resistance $R_{13}$ and display light emitting diode LD. Connected with the power source line EL through a main switch SW is the positive terminal of a power source E whose negative terminal is grounded. Emitters of Tr3 to Tr6 are all grounded. Between collector and emitter of Tr3 and between collector and emitter of Tr4 there are parallel connected diodes $D_1$ and $D_2$ in opposite direction respectively. Bases of Tr5 and Tr6 are grounded through integration condensers $C_1$ and $C_2$ respectively. Connected to the both ends of condensers $C_1$ and $C_2$ are collector and emitter of discharging transistors Tr7 and Tr8 respectively. Bases of Tr7 and Tr8 are connected to terminals ML1 and ML2 through $R_9$ and $R_4$ respectively. Transistors Tr5 and TR6 are condensers $C_1$ and $C_2$ constitute together a time discrimination circuit.

The lens driving circuit SMD shown in FIG. 3 and described above in detail drives the photographing lens LS in the following manner in response to a combination of output signals from PUC as shown in FIG. 5:

For example, when the object is at the remote distance side relative to the present position of the focus ring for lens LS, that is, in case of forward-focus, ML2 and MU2 become, for example, "H" level whereas ML1 and MU1 become "L" level to drive the motor MT forward. When the object is at the near distance side, namely in case of rearward-focus, MU1 and ML1 and turned to "H" whereas MU2 and ML2 are reversed to "L" to drive the motor MT in the reversed direction. In either case, the photographing lens LS is moved toward the in-focus position by the driving motor. During the time of the lens LS being driven toward the in-focus position, transistor Tr1 or Tr2 is On and transistor Tr9 is turned On through diode D3 or D4 so that the display element LD emits light to indicate that the photographing lens LS is now being driven.

Upon the time when the lens LS reaches the in-focus position, the level of ML1 and ML2 are inverted to "H" and that of MU1 and MU2 to "L" so that the motor MT is short-circuited. Thus, the lens LS is stopped at once and Tr1 or Tr2 is turned Off. The light of display element LD therefore puts off, which indicates that the photographing lens is now at the in-focus position.

In the above circuit according to the invention, the condensers C1 and C2 connected to the bases of transistors Tr5 and Tr6 have particular functions. C1 and C2 serve to delay the turn-on of transistors Tr5 and Tr6 by a definite delay time. On the other hand, the condensers C1 and C2 serve to shorten the turn-off of Tr5 and Tr6 by instantaneous discharge of C1 and C2 through the transistors Tr7 and Tr8. This has an effect to exclude noisy focus detection information appearing in a very short time which may be otherwise caused by various noises such as discordance between fundamental image and reference image due to false adjustement of the focus detecting optical block, irregularity of sensitivity among picture elements of the solid image pick-up element and unintentional movement of the camera. According to the invention, as previously described, the photographing lens is driven only when a predetermined focusing state detection information continues for a predetermined time length. Therefore, a stable focusing operation is attainable. Flicker of the focus state display element can be prevented and the state of focus adjustment now present is displayed in a stable manner.

The manner of operation of the apparatus shown in FIG. 3 will be described hereinafter with reference to the timing chart in FIG. 4.

At time points $t_1$, $t_2$, $t_3$, . . . , $t_{51}$ and so on, focusing state detection information signals are put out repeatedly through control terminals ML1, ML2, MU1 and MU2 of the control circuit PUC. One detection information output signal is held until output of the next information signal.

During the period of from $t_1$ to $t_{10}$ the level of ML2 and MU2 is "H" and that of ML1 and MU1 is "L" and therefore transistors Tr3 and Tr2 are On whereas Tr1 and Tr4 are Off. In this position, electric current flows into the motor MT. The motor MT drives the photographing lens LS into movement, for example, in the direction toward the object at infinity. At the same time, the display element LD emits light to indicate that the photographing lens LS is now being driven.

At the time point $t_{10}$, the level of ML1 is inverted to "H" and that of MU2 to "L" so that transistors Tr3 and Tr4 are turned On and Tr1 and Tr2 are Off. Thereby, the motor MT is short-circuited and stopped instantaneously. The lens LS is fixed at the in-focus position. At the same time, the light of the display element LD puts off which indicates that the photographing lens LS is now at the in-focus position.

If a detection signal informing of the state of rearward-focus is issued for a moment at $t_{12}$, then ML2 is inverted to "L" level and MU1 to "H" level at the time of from $t_{12}$ to $t_{13}$. If there were not provided in the apparatus such delay circuit constituted of condensers C1, C2 etc. mentioned above, the level inversion of ML2 and MU1 in this instance would make the current flow to the motor in the direction of arrow A in FIG. 3 through the transistors Tr1 and Tr4. Accordingly, the photographing lens would be driven toward the short distance side. Under the same assumption, if there is issued at $t_{13}$ the same detection signal as that issued at $t_{11}$, then ML1 is turned to "L" and MU2 to "H" at the time of from $t_{13}$ to $t_{14}$. As a result, the photographing lens LS will be moved back to the in-focus position which the lens LS has once taken at the time point $t_{11}$. Since a reciprocal motion of the lens LS is produced in this manner during the time of from $t_{12}$ to $t_{14}$, the display element LD will light up during the time to indicate that the photographing lens is moving.

In contrast with the above, the apparatus according to the invention includes a delay circuit comprising condensers C1 and C2 as described above. Therefore, such focus state detection information signal momentarily appearing in the detector is ignored. As an example, if a detection signal informing of the state of forward-focus is issued for a moment at $t_{18}$, then ML1 will be inverted to "L" and MU2 to "L" during the time of $t_{18}$ to $t_{19}$. However, in this case, since during the time of from $t_{14}$ to $t_{18}$ the photographing lens has been in focus and transistors Tr7 and Tr8 have been turned on to make the delay condensers C1 and C2 discharged, the terminal voltage of C2 can not reach the threshold level VTH for turning Tr6 on at the time of from $t_{18}$ to $t_{19}$. The capacity of C2 is preselected for this purpose. Therefore, transistor Tr2 is prevented from turning on in spite of the level inversion of ML1 and MU2 during the time of $t_{18}$ to $t_{19}$ and Tr2 remains Off. In this manner, the detection signal momentarily appeared is ignored to prevent the photographing lens from being driven by such momentary information signal. The photographing lens continues staying at the in-focus position and the display element also continues indicating in a stable manner that the photographing lens is at the in-focus position.

When the level of ML1 is inverted to "H" at $t_{19}$, the charge on the condenser C2 is discharged instantaneously through transistor Tr8. Therefore, the terminal voltage of the delaying condenser can not reach the threshold level VTH for turn-on of the transistor unless a predetermined focusing state detection signal is put out continuously for a certain predetermined time.

In FIG. 3, $R_3$, $R_5$, $R_8$ and $R_{10}$ are all current limiting resistors. These resistors are not always necessary when constant current driving can be performed by the control circuit PUC through control terminals ML1, ML2, MU1 and MU2.

When it is wished to take a picture of an object at a shorter distance at the time point $t_{50}$, ML2 is inverted to "L" level and MU1 to "H". Therefore, the potential at the base of the transistor Tr5 can reach the turn-on threshold VTH at the time point $t_N$. Nearly at the same time, transistor Tr1 is also turned On. Thus, the photographing lens LS is driven in the direction toward the shorter distance side. Simultaneously, the display element LD emits light to indicate that the photographing lens is moving.

While the invention has been particularly shown and described with reference to preferred embodiments thereof, it will be understood by those skilled in the art that the foregoing and other changes in form and details can be made therein without departing from the spirit and scope of the invention.

What we claim is:

1. A camera provided with an automatic focus detector, comprising:

a focusing state detecting circuit for discriminating the state of focus of an object image on a predetermined focal plane of a photographing lens from among at least three different states including forward-focus, in-focus and rearward-focus and for producing one of at least three different electrical signals corresponding to said at least three different focusing states, respectively, as an output signal;

photographing lens driving control means for moving the photographing lens along the photographing optical axis in accordance with the output signal from said focusing state detecting circuit and controlling the movement of the photographing lens in such manner that the focusing state on the focal plane can be brought into the in-focus state; and a time discriminating circuit for discriminating whether or not the output signal from said focusing state detecting circuit is issued continuously for a time longer than a predetermined time and, when continuously issued for the predetermined time allowing said photographing lens driving control means to drive the photographing lens, wherein said time discriminating circuit comprises integration circuit means which starts integrating from the time when the state of the output from said focusing state detecting circuit changes; switching circuit means which operates when the integrated output from said integration circuit means exceeds a predetermined level or lowers below said level; and resetting means for resetting said integration circuit when the next change in the state of the output from said detecting circuit occurs.

2. A camera according to claim 1 wherein said integration circuit means comprises at least one condenser and said resetting means comprises switching means so disposed as to form a discharge line for said at least one condenser.

3. A camera according to claim 1 wherein said resetting means is held in reset position during the time of such signal indicative of in-focus state being put out from said focusing state detecting circuit.

4. A camera provided with an automatic focus detector, comprising:

a focusing state detecting circuit for discriminating the state of focus of an object image on a predetermined focal plane of a photographing lens from among at least three different states including forward-focus, in-focus and rearward-focus and for producing one of at least three different electrical signals corresponding to said at least three different focusing states respectively, as an output signal;

indicator means for providing an indication in a form perceptible by the operator in accordance with the output signal from said focusing state detecting circuit; and a time discriminating circuit for discriminating whether or not the output signal from said detecting circuit is issued continuously for a time longer than a predetermined time and, when continuously issued for the predetermined time, allowing said indicator means to provide an indication, wherein said time discriminating circuit comprises integration circuit means which starts integrating from the time when the state of the output from said focusing state detecting circuit changes; switching circuit means which operates when the integrated output from said integration circuit means exceeds a predetermined level or lowers down below the level; and resetting means for resetting said integration circuit when the next change in state of the output from said detecting circuit occurs.

5. A camera according to claim 4 wherein said integration circuit means comprises at least one condenser and said resetting means comprises switching means so disposed as to form a discharge line for said at least one condenser.

6. A camera according to claim 4 wherein said resetting means is held in reset position during the time a signal indicative of in-focus state is put out from said focusing state detecting circuit.

7. An optical instrument provided with an automatic focus detector, comprising:

a focusing state detecting circuit for discriminating the state of formation of an object image on a predetermined focal plane of an optical system from among at least three different states including forward-focus, in-focus and rearward-focus, and producing one of at least three different electrical signals corresponding to said at least three different focusing states, respectively, as an output signal;

optical system driving control means for moving a part of said optical system in accordance with the output signal from said focusing state detecting circuit and controlling the movement of the part of said optical system in such a manner that the image formation on the focal plane is brought into the in-focus state;

a time discriminating circuit for discriminating whether or not the output signal from said focusing state detecting circuit is held for a predetermined time period, and allowing, when it is held for the time period, said optical system driving control means to drive the part of said optical system; and reset means for resetting the time-discriminating operation of said time discriminating circuit while the image formation on said focal plane is in the in-focus state.

8. An optical instrument according to claim 7 wherein said time discriminating circuit is connected to the output end of said focusing state detecting circuit so as to control the transmission of the output signal to said optical system driving control means from said detecting circuit.

9. An optical instrument provided with an automatic focus detector, comprising:

a focusing state detecting circuit for discriminating the state of formation of an object image on a predetermined focal plane of an optical system from among at least three different states including foward-focus, in-focus and rearward-focus, and producing one of at least three different electrical signals corresponding to said at least three different focusing states, respectively;

indicator means for providing an indication as an output signal, in a form perceptible to an operator, in accordance with the output signal from said focusing state detecting circuit; and a time discriminating circuit for discriminating whether or not the output signal from said detecting circuit is held for a predetermined time period, and allowing, when it is held for the time period, said indicator means to provide an indication.

10. An optical instrument according to claim 9 wherein said time discriminating circuit is connected to the output end of said focusing state detecting circuit so as to control the transmission of the output signal to said indicator means from said detecting circuit.

11. An optical instrument according to claim 9 wherein said indicator means displays visual information within a viewfinder of the optical instrument.

* * * * *